Dec. 31, 1968

E. B. NOLT ET AL 3,419,300

TWINE FINGER FOR KNOTTER MECHANISM OF BALER

Filed Aug. 16, 1967

INVENTORS
EDWIN B. NOLT
& RICHARD R. EBY

BY

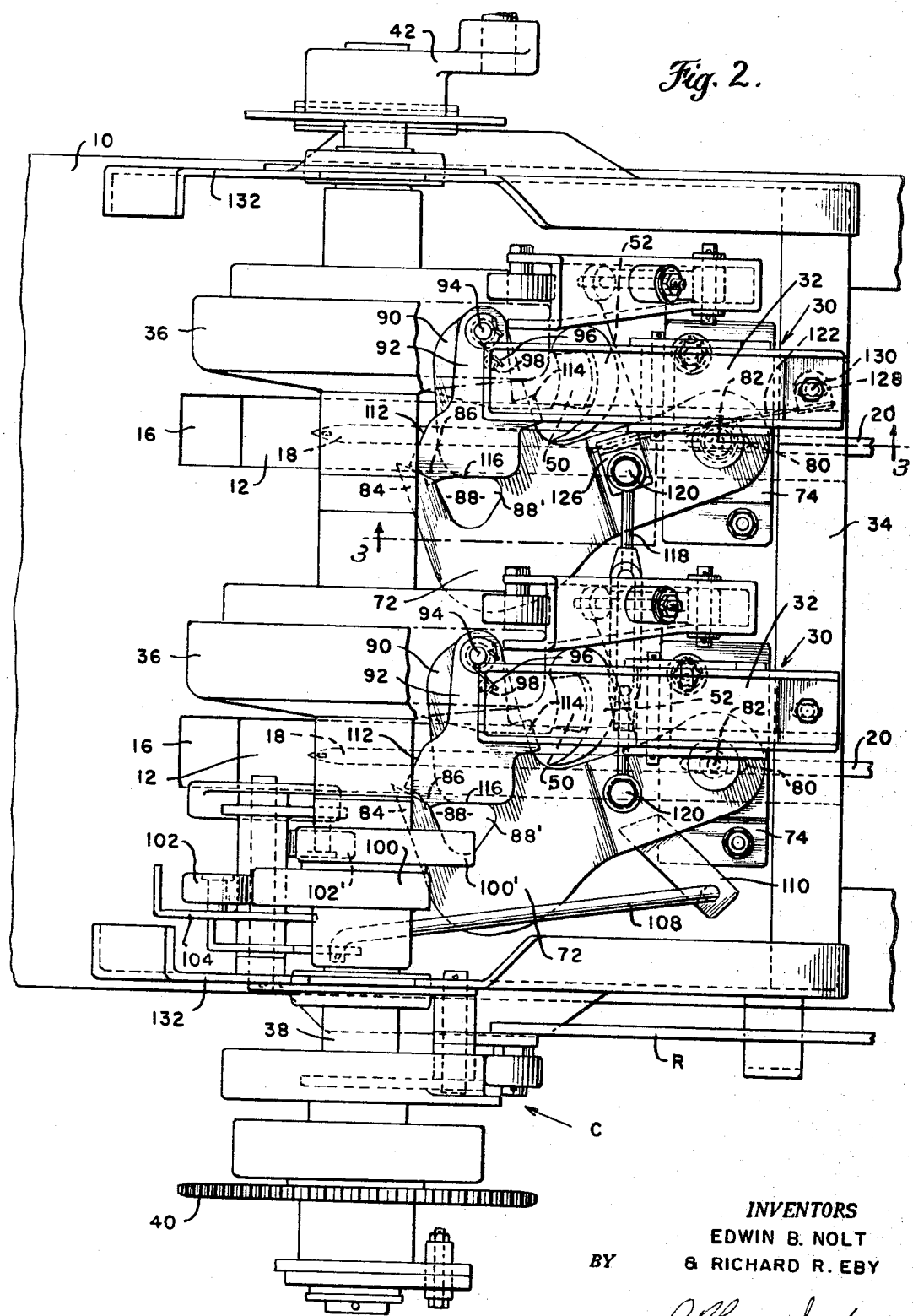

Dec. 31, 1968  E. B. NOLT ET AL  3,419,300
TWINE FINGER FOR KNOTTER MECHANISM OF BALER
Filed Aug. 16, 1967

INVENTORS
EDWIN B. NOLT
& RICHARD R. EBY

United States Patent Office 3,419,300
Patented Dec. 31, 1968

3,419,300
TWINE FINGER FOR KNOTTER MECHANISM
OF BALER
Edwin B. Nolt, New Holland, and Richard R. Eby, Ephrata, Pa., assignors to Sperry Rand Corporation, New Holland, Pa., a corporation of Delaware
Filed Aug. 16, 1967, Ser. No. 661,033
11 Claims. (Cl. 289—13)

ABSTRACT OF THE DISCLOSURE

Knotter mechanism for a baler employing twine to form securing loops thereof around a bale, the knotter mechanism including a knotter unit and clamping unit arranged to cooperate to tie into a knot the ends of a loop of twine extending around said bale, a twine needle arranged to extend one end of such loop of twine around said bale and into the region of the knotter and clamping units, and means to operate all said items of said mechanism in tying relationship, in combination with a twine finger movable into engagement with the ends of said loop of twine incident to being tied and having a notch therein terminating in an eye therein to receive said ends of said loop initially to maintain the same in position to be positively engaged by the knotter unit, and a latch is pivotally connected to said finger adjacent said notch and being operable subsequently to said first movement to insure positive pulling of the tied ends of the loop of twine from the bill hook of said knotter unit when said finger is restored to inoperative position.

BACKGROUND OF THE INVENTION

In the operation of knotter mechanism cf the type to which the present invention pertains, basic principles of which are generally shown in prior Patents Nos. 512,762 to Stewart, and 615,815 to Dennis, the terminal end of a strand of twine is securely clamped to a clamping unit of the knotter mechanism. This is usually positioned adjacent the top of a bale case through which the compressed material progressively moves while said strand of twine extends around the leading end of the bale while being formed and beneath said bale, through the eye in the outer end of an arcuate twine needle which, at the desired moment in the cycle of operation of the knotter mechanism projects the trailing end of a strand of twine, while still connected to the supply thereof, upwardly around the trailing end of the bale which has thus been formed and into engagement with the knotter unit which is adjacent the clamping unit. The strand leading from the supply and extending to the eye in the needle forms an elongated loop with the trailing end of the loop of twine extending around the bale prior to the tying of the ends of said last mentioned loop around the bale into a tight knot which is accomplished by the knotter unit.

The knotter unit includes a fixed jaw supported by a rotatably mounted shaft and a bill hook tongue is pivotally associated with the fixed jaw for movement of the outer end of the tongue toward and from the outer end of the jaw so as sequentially to clamp strands of twine therebetween and release the same incident to the tying of said aforementioned knot to secure together the ends of the loop of twine which extends around the bale.

The shaft which supports the fixed jaw and pivoted tongue of the bill hook structure is supported for rotation about the axis of the shaft while the jaw and tongue project substantially transversely from the outer end of said shaft. Incident to the tying of a knot, when the jaw and pivoted tongue of the bill hook structure are being rotated by the shaft, certain portions of the strand of twine extend over certain ports of the bill hook structure while the strands extend between said jaw and tongue.

In the operation of conventional knotter mechanism occasionally the completed knot is accidentally retained upon the bill hook structure at the completion of the tying thereof. This might be caused, for example, by the arm which strips the knot from the bill hook being out of adjustment.

SUMMARY OF THE INVENTION

The principal purpose of the present invention is to provide in association with knotter mechanism assemblies of twine extending through the tye in the twine finger preferably formed from sheet metal, by stamping or the like. One end of said lever is arranged to be pivotally supported by appropriate bracket mechanism adjacent one end of an elongated slot or opening in the top of the bale case through which the outer end of the twine needle is projected incident to carrying the twine around the trailing end of a bale for engagement by the knotter unit. The opposite end of said twine finger is provided with a slot terminating in an enlargement forming an eye, while said outer end preferably terminates in a hook formation at one side of said slot.

Actuating means is connected to said twine finger which is driven in desired sequence with the operation of the other elements of each knotter mechanism assembly in such manner that when a strand of twine is moved upwardly around the trailing end of a bale by the twine needle to bring the same into operative engagement with the bill hook structure of the knotter unit, the twine finger is moved laterally toward the knotter unit and receives within the eye of said finger the opposite ends of a loop of twine which extends around the bale and which ends are to be tied into a knot by said knotter unit. Such movement of the twine finger and engagement thereof with said ends of said loop of twine insure the twine being positively engaged by the bill hook structure of the knotter unit for a desired operation thereof to form a tight knot without mishap or malfunction.

Further, to insure the desired operation of the twine finger referred to above and also to increase the versatility thereof, said finger preferably is provided with a latch which may be formed from material similar to that from which the twine finger is formed. The latch is pivotally connected to a lateral extension of the twine finger and the pivot means preferably is provided with a spring which coacts with the latch in a manner to constantly urge the same to extend a portion thereof across the throat of the slot in the twine finger which terminates in said eye.

One end of said latch is in the form of a cam which functions when the twine finger is being moved toward operative position to engage the taut strands of twine which are supported by the knotter and clamping unit and thus serve to pivotally move the latch from its position across the throat of the notch in the twine finger and permit entry of the strands into the eye of said finger, followed by the latch immediately being restored to blocking position across the throat of the notch and thereby trapping said strands of twine within the eye with respect to the knotter and clamping units.

Another beneficial feature of the latch which is connected to said twine finger comprises providing another surface thereon which is positioned to engage the strands of twine extending through the eye in the twine finger when said finger is being retracted to inoperative position which occurs at the completion of the tying of a tight knot in said strands of twine and during the final operation of such tying the knot is enclosed by the bill hook structure, whereby such retracting movement of the twine finger and the engagement of said surface on said latch with the strands of twine in the eye of the finger insure, positively, the removal of the tied knot from the bill hook structure of the knotter unit.

In view of the fact that a bale of hay, straw or the like usually is tied by at least two strands of twine which are looped around the bale in transversely spaced position to each other, each strand which is to be tied around the bale requires a knotter mechanism assembly of the type described above and comprises knotter and clamping units, a twine needle, and a twine finger, as well as actuating means to operate the same. Accordingly, it is contemplated by the invention that each knotter mechanism assembly includes a pivoted twine finger and latch thereon.

In order to simultaneously operate such plurality of the same however, it is contemplated by the present invention to directly actuate only one twine finger by drive mechanism associated with the other units and elements of the knotter mechanism assembly, and provide connecting linkage between adjacent twine fingers for simultaneous operation of all said fingers by said actuating mechanism. Similarly, anti-backlash spring means is provided preferably in association with a twine finger to compensate for manufacturing clearances and wear in the twine finger driving linkage.

BRIEF DESCRIPTION OF THE DRAWINGS

FIG. 2 is a fragmentary top plan view of the mechanism shown in FIG. 1 and illustrating a plurality of outer mechanisms and corresponding twine fingers associated therewith.

DESCRIPITION OF THE PREFERRED EMBODIMENTS

Figure 1:
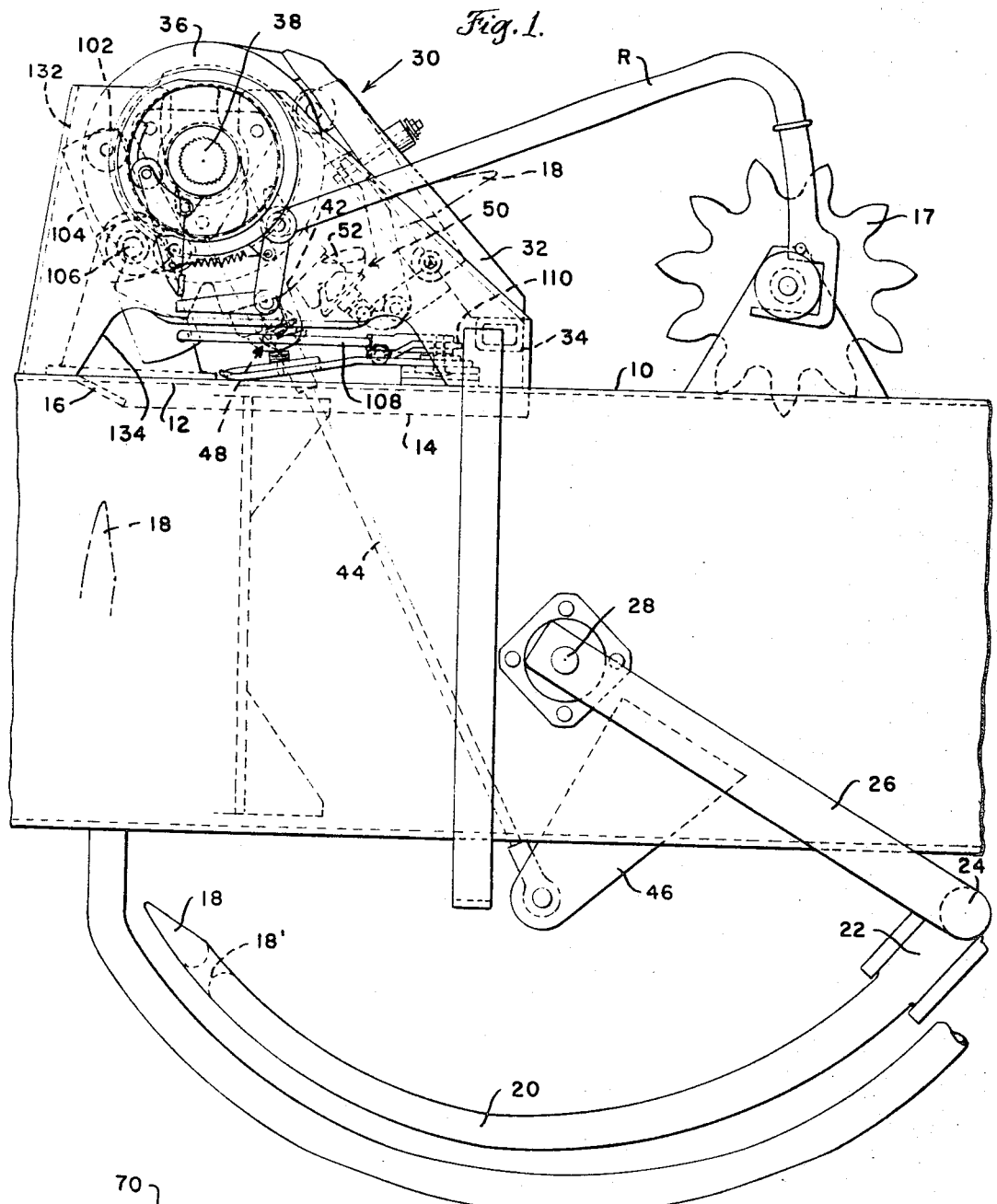
FIG. 1 is a fragmentary side elevation of the bale case portion of a baler upon which a knotter mechanism assembly is mounted for cooperative relation with an arcuate needle, said view also illustrating a twine finger embodying the principles of the present invention.
Figure 3:
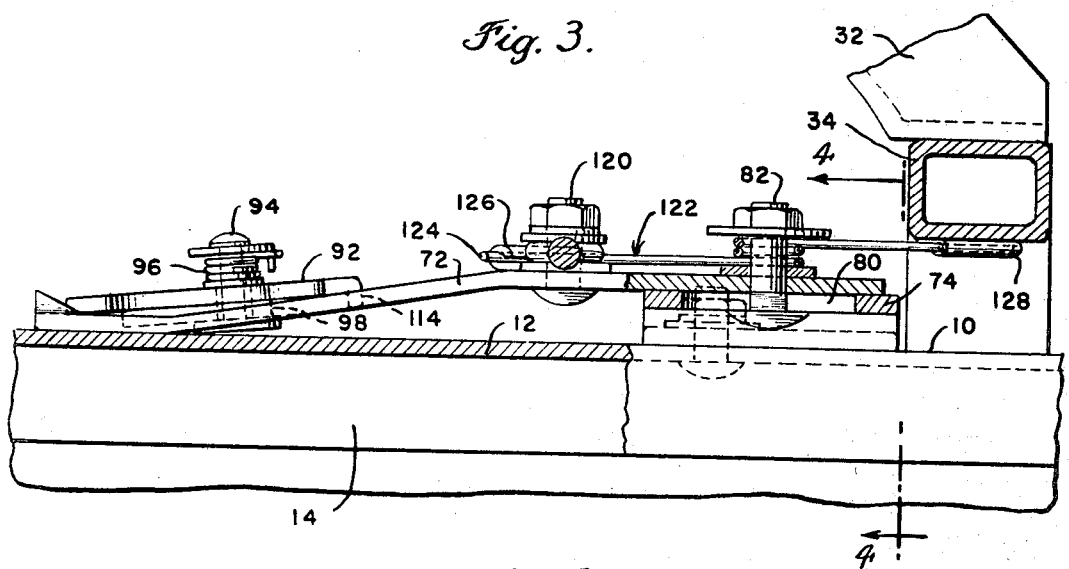
FIG. 3 is an enlarged, fragmentary vertical sectional view of a portion of the mechanism shown in FIG. 2 as seen on the lines 3—3 of said figure.
Figure 4:
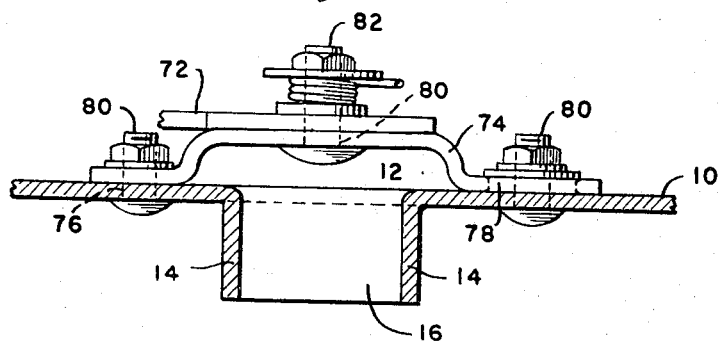
FIG. 4 is a fragmentary transverse vertical sectional view of a portion of the mechanism shown in FIG. 3 as seen on the lines 4—4 of said figure.

Referring to FIGS. 1 and 2, it will be seen that a generally horizontally extending sheet steel case 10 of a baler is illustrated fragmentarily, it being understood that the same is supported for mobile operation relative to a hay field or the like. In its preferred construction, the case 10 is rectangular in cross-section. The top thereof also is provided with a plurality of openings 12 which preferably are in the form of parallel, elongated slots. The metal removed from the sheet thereof forming the top of the case 10 to provide the slot 12 is bent downwardly along opposite sides of the slot 12 in the form of flanges 14 which are best shown in FIGS. 1, 3 and 4. The forward end of the slots 12 also have an angularly extending forward tongue 16. Each of the slots 12 receive the free end 18 of an arcuate twine needle 20, the base end 22 of which is connected to a transverse rod of bar 24 of a needle yoke. Bar 24 extends transversely beneath the case 10 and its opposite ends are connected to the outer ends of a pair of arms 26 respectively supported at the opposite ends thereof by pintles 28 at opposite sides of the case 10.

Mounted preferably on the top of the base 10 are a pair of similar knotter mechanism assemblies 30 which respectively comprise a fixed arm 32 which is connected at one end to a transverse supporting bracket 34 that is affixed at its ends to the top of case 10. Rigidly connected to the upper end of each arm 32 is a knotter frame casting 36 having suitable bearings through which a drive shaft 38 extends continuously between opposite sides of the case 10. Said shaft is provided with a driving sprocket gear 40 which, in turn, is connected to appropriate drive means, not shown, associated with the baler.

Connected to one end of drive shaft 38 is a crank arm 42 to the outer end of which one end of a connecting rod 44, see FIG. 1 is pivotally connected, the opposite end thereof being pivotally connected to the outer end of a lateral arm 46 connected to one of the arms 26 of the needle yoke. The knotter cycle is controlled by a one-revolution clutch C triggered by a metering wheel M through a trip rod R. Such structure is conventional. Accordingly, when the knotter cycle occurs, the drive shaft 38 rotates a single revolution in a very short interval of time, less than one second according to preferred operations.

By means of mechanism illustrated in other applications of the present series of applications, to which attention is directed, the knotter unit 48 and clamping unit 50 of each knotter mechanism assembly 30 is operated sequentially and in cooperation with each other to effect the tying of a knot between one end of a strand thereof which is clamped between the cooperating clamping members of clamping unit 50 and the trailing end of a loop which is carried upwardly past the knotter and clamping units 48 and 50 by the eye 18' in the outer end 18 of the needle 20 of each knotter mechanism assembly, the uppermost extended position of which is shown in phantom in the upper portion of FIG. 1. Such movement of the needle is effected by the various links and arms described hereinabove which actuate the same.

Referring to FIG. 2, it will be seen that the clamping unit of each of the knotter assemblies 30 are positioned immediately adjacent one side of each elongated opening 12 in the top of case 10. With reference to FIG. 1 and visualizing the same with respect to FIG. 2, it will be seen that in FIG. 2, the knotter unit of each of the assemblies 30 is immediately in back of each clamping unit 50 shown in FIG. 2. Accordingly, it will be understood that each of the knotter units 48 likewise is adjacent one side of each of the elongated openings 12.

From FIG. 2, it will also be seen that the needles 20 are disposed substantially centrally between opposite sides of the elongated openings 12 and thus are operable to move the strands of twine which are looped around the compressed material of the bale into a position to be engaged by the arcuate twine hooks 52 which are each carried by the outer end of a shaft, not shown in detail, which projects radially from each knotter frame casting 36 and supports the outer clamping member of each clamping unit 50. Said shafts also rotate the arcuate twine hooks 52 in a direction to engage one of the strands extending from the eye in the outer end 18 of each needle 20 incident to the knotting sequence being performed during said aforementioned rotation of drive shaft 38.

Figure 6:
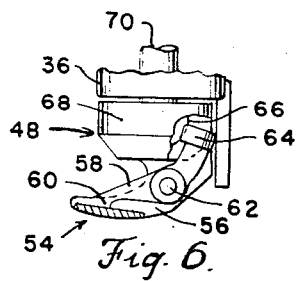
FIG. 6 is a fragmentary view, partly in vertical section, showing details of a bill hook assembly of the knotter unit shown in FIG. 1 in phantom.

A principal purpose of the present invention is to insure that the twine which is carried upwardly into the region of the knotter and clamping units 48 and 50 by the outer end 18 of each needle 20 will be positioned accurately for engagement by the bill hook mechanism 54 shown fragmentarily in FIG. 6. Further details of the bill hook are illustrated and described to a greater extent in certain other applications of the series co-pending herewith. The bill hook mechanism comprises a fixed jaw 56 having an upper longitudinal groove to receive a bill hook tongue 58 which has a short hook-like extension 60 on the outer end thereof and is pivotally supported upon a cross-pin 62 for actuation by a roller 64 on the opposite end thereof which engages a cam surface 66 within the cup-like shell 68 which is fixed to the rotatable shaft 70 that extends radially to the knotter frame casting 36 as previously described.

Figure 5:
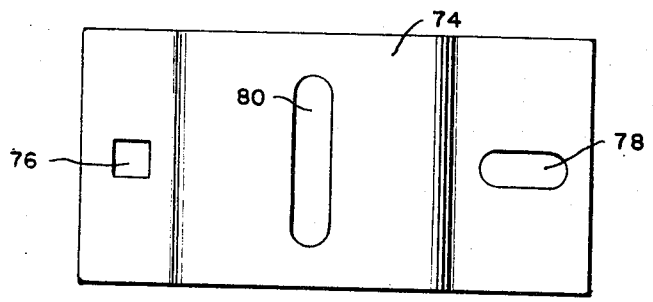
FIG. 5 is a top plan view showing details of a bracket otherwise illustrated in FIGS. 3 and 4 which supports a twine finger illustrated therein.

To insure that the strands of twine which are moved upwardly into association with the knotter and clamping units 48 and 50 will, in particular, engage the bill hook mechanism 54 of the knotter unit 48, a twine finger 72 is to provide for each of the knotter mechanisms assemblies 30. The preferred plan view shape of finger 72 is best illustrated in FIG. 2. A supporting bracket 74, details of which are best shown in FIGS. 4 and 5, is formed from sheet metal and has an intermediate portion spaced above the upper surface of the top of case 10 of the baler as clearly shown in FIGS. 3 and 4. The opposite ends of bracket 74 are respectively provided with a square hole 76 and a short transverse slot 78 which respectively receive bolts 80 by which the ends of the bracket are secured to the top of case 10. Extending transversely to the longitudinal axis of bracket 74 and intermediately of the opposite sides thereof and parallel thereto is a slot 80 which receives the shank of a pivot bolt 82. The pivot bolt 82 extends through a bearing hole in one end of twine finger 72 of each assembly 30 and the opposite end of each twine finger terminates in a hook-like extension 84 which defines one side of a notch 86 which terminates in an enlarged inner end comprising an eye 88. The slot 80 permits accurate adjustment of the twine hook relative to the knotter unit 48 when the baler is conditioned for use.

Each finger 72 also is provided with a lateral extension 90 which provides a support for one end of a latch 92 which is pivotally connected at one end to the outer portion of the extension by a pivot bolt or rivet 94. Preferably, a coiled spring 96 extends around the pivot bolt 94 between the parallel adjacent faces of the latch 92 and lateral extension 90, one end of the spring 96 being anchored in a suitable hole formed, for example, in the lateral extension 90, while the opposite end of said spring engages a short pin or lug 98 formed on latch 92. The force of the spring is exerted in the required direction to urge the latch normally into the position shown in FIG. 2 with respect to the twine finger 72 and especially the eye 88 thereof. In this position, a portion of the latch 92 extends across the throat of notch 86 and, in association with the major portion of the circumference of the eye 88 forms an enclosure which receives strands of twine under circumstances described as follows.

When the needle 20 has moved almost to its fullest projected extent as shown in the uppermost position of FIG. 1 is phantom, a cam 100 fixed to drive shaft 38 is so arranged with respect to a cam follower 102 rotatably mounted on one end of a lever 104 that is pivoted intermediately of its ends upon a shaft 106, that it actuates the opposite end of said lever to activate connecting rod 108. One end of connecting rod 108 is connected to said opposite end of lever 104 and the other end of said connecting rod is connected to a laterially extending lever 110 fixed to the adjacent twine finger 72 as viewed in FIG. 2, intermediately of the ends thereof.

The above described actuation of connecting rod 108 pivotally moves the twine finger 72 connected thereto clockwise and, as viewed in FIG. 2, serves to project the eye 88 of said finger at least partially beneath the bill hook. Incident to such movement, the opposite ends of the loop of twine encircling the bale are intercepted by the outer edge 112 of the latch 92. Said edge 112 comprises a cam which operates slidably relative to said ends of twin, which are supported in taut condition under such circumstances, and causes the latch 92 to be moved counterclockwise, as viewed in FIG. 2, and thereby open the throat of the notch 86 to permit said strands to be received within the eye 88 of the twine finger 72. Movement of the twine finger 72 in clockwise direction is controlled by the shape of the cam 100.

As soon as the movement of the twine fingers 72 has extended sufficiently to dispose the ends of said loop of twine within the eye 88, the spring 96 immediately and automatically restores the latch 92 to its normal position such as shown in FIG. 2, whereupon it is obvious that said ends of the loop of twine around the bale are entrapped within the eye 88. It will be understood that said eye under such circumstances is disposed at least partially beneath the bill hook at this time rather than in the position shown in FIG. 2 which is the normal, inoperative position of the twine finger 72. Movement of the latch 92 to the position shown in FIG. 2 with respect to the twine finger 72 is limited by a perpendicular stop extension 114 which engages one edge of the lateral extension 90 of the twine finger 72 of each assembly 30. Such engagement is well illustrated in FIG. 3.

At the completion of the tying of a knot to connect the ends of the loop of twine encircling the bale, the final step in forming said knot comprises the gripping of a small loop of two strands of twine in said knot being engaged between the tongue 58 and fixed jaw 56 of the bill hook mechanism 54. The hook like extension 60 of the tongue 58 engages said short loops to insure that the same will be tugged sufficiently to tighten the knot immediately prior to said loops being released, such release being effected by operation of the cam roller 64. Under certain circumstances, it has been found that said short loops are not always readily released from the tongue 58 and especially the extension 60 thereon, notwithstanding the fact that the latter has a somewhat rounded release edge. To insure that the completed knot will positively be extracted or removed from the bill hook mechanism 54 such as shown in FIG. 6, the latch 92 is provided with a surface or edge 116 which, when the twine finger 72 is being moved to its inoperative position, which is that illustrated in FIG. 2, the surface 116 will engage the strands of twine immediately adjacent the completed knot, whereby as the tied bale then moves through the bale case responsive to the formation of the next bale, the knot will be effectively stripped from the bill hook.

From the foregoing, it therefore will be seen that the twine finger 72 of each mechanism assembly 30 not only insures positive engagement of the twine with the bill hook mechanism 54 of each knotter unit 48 but, in addition, the surface 116 of each latch 92 additionally insures the positive stripping and disengagement of a completed knot from the bill hook mechanism 54.

In order to simplify the actuating mechanism for a plurality of twine fingers 72, the connection of the actuating connecting rod 108 to only one of the twine fingers 72 is adequate to operate the other twine finger 72 and identically due to the provision of a preferably longitudinally adjustable connecting link means 118 extending between the intermediate portions of an adjacent pair of the twine fingers 72, as clearly shown in FIG. 2. The opposite ends of link means 118 are pivotally connected to the twine fingers 72 by appropriate pivot bolts 120. The adjustability of the connecting link means 118 may be by a turn buckle or the like and permits very precise simultaneous and identical movement of all twine fingers 72 of the respective knotter mechanism assemblies 30 at the time of tying a plurality of loops of twine around a single bale.

In view of the interlinking of the twine fingers 72 by the connecting link means 118, it is only necessary to provide a single means to restore the assembly of twine fingers 72 to the initial, inoperative position thereof such as shown in FIG. 2. Such means comprises return cam 100' and cam follower 102'. In addition, a blacklash spring 122 is provided to compensate for wear and tolerance, to be sure that the fingers return to proper position. This is in addition to the movement provided by return cam 100'. Intermediately of its ends, spring 122 is coiled for several convolutions about the pivot bolt 82 of its associated twine finger 72, as viewed in FIG. 2. One end 124 of spring 122 is secured by an anchor 126 which is provided with a suitable hole that receives pivot bolt 120 in the twine finger 72 as viewed in FIG. 2. The opposite end of said spring is held by another anchor 128 which is secured by an appropriate bolt 130, see FIG. 2, such as one of those by which the lower end of fixed arm 32 of the uppermost frame casting 36, as viewed in FIG. 2, is secured to the supporting bracket 34.

By such arrangement, at the completion of the knotting operation, return cam 100' pivots fingers 72 back to starting position. In addition, the spring 122 is of such strength as to be adequate to insure restoration of each of the twine fingers 72, to precise inoperative positions thereof shown in FIG. 2, wherein they will be in position to be projected to operative positions relative to the knotter and clamping units 48 and 50 the next time that knots are to be tied in the ends of the loop of twine which surround the next bale to be formed.

The drive shaft 38 preferably is supported by a pair of sheet metal or cast standards 132 extending upwardly from the top of case 10, respectively adjacent opposite sides thereof as can best be seen in FIG. 2. The standard 132 which is nearest the driving sprocket gear 40 as viewed in FIG. 2, is provided with a clearance opening 134 which is defined by a solid line in FIG. 1 on standard 132 shown therein.

The upper edge of opening 134 is at a level slightly above the connecting rod 108 shown in FIG. 1 and the width thereof is completely adequate to permit the ejection of any accumulating material such as shreds and pieces of hay, straw, or other similar material which tends to accumulate on top of the twine fingers 72 during operation of the baler. When the twine fingers 72 are moved to the initial position thereof shown in FIG. 2, such accumulating material will be engaged by the same. Due to the fact that such movement of fingers 72 is quick, the fingers are capable of kicking such accumulated material outwardly through the clearance opening 134 so as to free the machine thereof and minimize any tendency of the accumulated material to interfere with the proper functioning of the apparatus on top of case 10.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. A knotter mechanism assembly for a baler comprising a knotter unit including a bill hook, a clamping unit to hold the terminal end of a strand of twine clamped during the tying cycle of the knotter unit, means to support and operate said units upon a bale case having an opening in the top thereof, a twine needle supported upon said case for projection of its free end through said opening in said top thereof to extend a loop of twine around a bale and position the trailing end of said loop of twine into engagement with said knotter and clamping units, and means to move said needle as aforesaid when sufficient material to form a bale has been compressed into said case, in combination with a twine finger supported relative to said case adjacent said opening in said top thereof through which said needle projects during a tying cycle and adjacent said knotter and clamping units, means pivotally supporting one end of said twine finger relative to said top of said case and the other end of said finger having an eye therein to receive therethrough the opposite ends of said loop of twine being tied around a bale and operable to hold said ends of twine in operative engagement with said knotter unit during operation thereof, means to move said other end of said twine finger relative to said knotter and clamping units, and means connected to said other end of said twine finger and located to engage the strands of twine immediately adjacent said knot at the completion of the formation thereof to insure pulling said knot from the bill hook as the next bale is formed in the bale case.

2. The knotter mechanism assembly according to claim 1 in which said opening in the top of said case extends longitudinally of the axis of said case and said means which pivotally supports said one end of said twine finger being arranged to support the opposite end of said finger with the eye therein for movement laterally toward and from one side of said opening.

3. The knotter mechanism assembly according to claim 2 in which the outer end of said twine finger which has said eye therein terminates in a hook formation having one edge leading to said eye, and said finger also being provided with a latch pivotally connected thereto and arranged to secure the ends of said loop of twine in said eye while being tied by said knotter unit.

4. The knotter mechanism assembly according to claim 3 in which said eye in said outer end of said twine finger comprises an enlarged inner end of a notch partially defined by one side of said hook and said latch being positioned across the throat of said notch to close it when said ends of said loop of twine are disposed in said eye.

5. The knotter mechanism assembly according to claim 4 further including spring means mounted to engage said latch and operable to urge the same toward closed position across the throat of said knot so as automatically to dispose the latch in said closed position after receiving said ends of said loop of twine therein.

6. The knotter mechanism assembly according to claim 4 in which said latch has an edge defining part of said eye when said latch is closed across the throat of said notch leading from said eye, said edge of said latch being positioned to engage the tied ends of said twine loop when the tying thereof has been completed by said knotter unit and being located at the conclusion of said tying operation to insure that the knot will be stripped off of the bill hook when the next bale is formed in the bale case and pushes the tied bale away from the knotter.

7. The knotter mechanism assembly according to claim 4 in which said latch has one cam shaped outer edge positioned to be engaged by said ends of said loop of twine to be tied by said knotter unit when said twine finger is moved from its initial inoperative position to its operative position adjacent said knotter unit, said cam shaped edge of said latch being operable to move the latch relative to the opening of the notch across which it normally extends sufficiently to permit the reception of said ends of a loop of twine through said notch and into said eye.

8. The knotter mechanism assembly according to claim 1 in which a plurality of knotter mechanism assemblies are mounted in transversely spaced relationship across the top of said bale case and said case correspondingly being provided with a similar number of openings respectively adjacent each of said knotter mechanism assemblies and a corresponding number of twine needles being supported by said case for operation respectively relative to said knotter mechanism assemblies, said knotter mechanism assemblies further including means to operate one of said twine fingers as aforesaid and a connecting link extending transversely to the axis of said bale case between and connected to adjacent twine fingers, thereby simultaneously to operate all said twine fingers in unison.

9. The knotter mechanism assemblies according to claim 8 further including spring return means connected to another of said twine fingers and operable relative to said another finger to bias the same toward the initial inoperative position to said twine finger and correspondingly simultaneously move all of said twine fingers toward such inoperative starting positions thereof through the medium of said connecting links between said fingers.

10. The knotter mechanism assemblies according to claim 8 further including driving means mounted upon said case, lever means also supported upon said case and actuated by said driving means, and means connecting said one twine finger to said lever for actuation of the same thereby and also simultaneous operation of all other twine fingers connected thereto by connecting link means.

11. A knotter mechanism assembly as recited in claim 1 wherein said means to support and operate said units comprises upstanding side brackets mounted on said bale case, said brackets having openings to discharge accumulated crop material from around the knotter unit responsive to pivoting of said finger.

References Cited

UNITED STATES PATENTS

| | | | |
|---|---|---|---|
| 1,155,860 | 10/1915 | Witte | 289—13 |
| 3,101,963 | 8/1963 | Sullivan et al. | 289—2 X |
| 3,243,214 | 3/1966 | Keates | 289—2 |

LOUIS K. RIMRODT, *Primary Examiner.*